(12) United States Patent
Oh et al.

(10) Patent No.: US 10,340,498 B2
(45) Date of Patent: Jul. 2, 2019

(54) ELECTRODE ASSEMBLY WITH TAB-LEAD COUPLER AND METHOD FOR MANUFACTURING THE SAME

(71) Applicant: LG Chem, Ltd., Seoul (KR)

(72) Inventors: Sei-Woon Oh, Daejeon (KR);
Seong-Yoon Lim, Daejeon (KR);
Ji-Hyun Kim, Daejeon (KR);
Won-Seok Jeong, Daejeon (KR)

(73) Assignee: LG Chem, Ltd. (KR)

( * ) Notice: Subject to any disclaimer, the term of this patent is extended or adjusted under 35 U.S.C. 154(b) by 58 days.

(21) Appl. No.: 15/480,766

(22) Filed: Apr. 6, 2017

(65) Prior Publication Data

US 2017/0214028 A1      Jul. 27, 2017

Related U.S. Application Data

(63) Continuation-in-part of application No. PCT/KR2015/010726, filed on Oct. 12, 2015.

(30) Foreign Application Priority Data

Oct. 10, 2014 (KR) .......................... 10-2014-0136773
Mar. 19, 2015 (KR) .......................... 10-2015-0038163

(51) Int. Cl.
*H01M 2/26* (2006.01)
*H01M 4/70* (2006.01)
(Continued)

(52) U.S. Cl.
CPC ......... *H01M 2/266* (2013.01); *H01M 10/052* (2013.01); *H01M 10/0525* (2013.01);
(Continued)

(58) Field of Classification Search
CPC ............... H01M 2/266; H01M 10/052; H01M 10/0585; H01M 10/0525; H01M 4/70;
(Continued)

(56) References Cited

U.S. PATENT DOCUMENTS 9,209,428 B2    12/2015   Jung et al.
2012/0121965 A1*  5/2012  Makino .................. H01M 2/22
                                                         429/156

(Continued)

FOREIGN PATENT DOCUMENTS

JP    2005063855 A    3/2005
JP    2007165032 A    6/2007
(Continued)

OTHER PUBLICATIONS

International Search Report from PCT/KR2015/010726 dated Jan. 26, 2016.

*Primary Examiner* — Edu E. Enin-Okut
*Assistant Examiner* — Kwang Han
(74) *Attorney, Agent, or Firm* — Lerner, David, Littenberg, Krumholz & Mentlik, LLP (57) ABSTRACT

Disclosed is a battery cell, including an electrode assembly including electrode plates respectively having an electrode tab protruding therefrom and separators, which are alternately stacked, the electrode tabs being bent in an upper direction of the electrode assembly, the electrode assembly including an electrode lead coupled with an end of the bent electrode tabs to form a tab-lead coupler; and a battery case configured to accommodate the electrode assembly so that the electrode lead is partially exposed outwards. The tab-lead coupler is located on an extension line of an outermost electrode plate of the electrode assembly, which is located at a side where the electrode tabs are bent, and the tab-lead coupler is opposite to one side of the electrode assembly having the protruded electrode tab to come into contact with one side of the electrode assembly or be spaced apart therefrom.

6 Claims, 5 Drawing Sheets

(51) Int. Cl.
  *H01M 10/0585* (2010.01)
  *H01M 10/052* (2010.01)
  *H01M 10/0525* (2010.01)
  *H01M 2/20* (2006.01)

(52) U.S. Cl.
  CPC ........ *H01M 10/0585* (2013.01); *H01M 2/202* (2013.01); *H01M 4/70* (2013.01); *H01M 2220/20* (2013.01); *H01M 2220/30* (2013.01); *Y02T 10/7011* (2013.01)

(58) Field of Classification Search
  CPC ............. H01M 2/202; H01M 2220/20; H01M 2220/30; Y02T 10/7011
  See application file for complete search history.

(56) References Cited

U.S. PATENT DOCUMENTS

| | | | | |
|---|---|---|---|---|
| 2015/0044536 A1* | 2/2015 | Kwon | ................. | H01M 2/0207 429/94 |
| 2015/0318534 A1 | 11/2015 | Yoo | | |

FOREIGN PATENT DOCUMENTS

| | | | | |
|---|---|---|---|---|
| KR | 20000021401 A | 4/2000 | | |
| KR | 20010045058 A | 6/2001 | | |
| KR | 20080009351 A | 1/2008 | | |
| KR | 20080041113 A | 5/2008 | | |
| KR | 20110095819 A | 8/2011 | | |
| KR | 20130119700 A | 11/2013 | | |
| KR | 20140032739 A | 3/2014 | | |
| WO | WO-2013137611 A1 * | 9/2013 | .......... | H01M 2/0207 |

* cited by examiner

ELECTRODE ASSEMBLY WITH TAB-LEAD COUPLER AND METHOD FOR MANUFACTURING THE SAME

CROSS REFERENCE TO RELATED APPLICATIONS

The present application is a continuation-in-part application of International Application No. PCT/KR2015/010726 filed on Oct. 12, 2015, published in Korean, which claims priority to Korean Patent Application No. 10-2014-0136773 filed on Oct. 10, 2014 and Korean Patent Application No. 10-2015-0038163 filed on Mar. 19, 2015, the disclosures of which are incorporated herein by reference.

TECHNICAL FIELD

The present disclosure relates to an electrode cell and a method for manufacturing the same, and more specifically, to an electrode cell having the enhancement of a space utilization and a method for manufacturing the same.

BACKGROUND ART

Demands for utilization of the alternative energy and the clean energy increases because of the rapid increase in utilization of the fossil fuel. As a way of meeting the demands, the electricity generation and storage field applied with the electro-chemistry is most actively researched.

Currently, a representative example of an electrochemical device using such electrochemical energy is a secondary battery, the use of which increasingly expands.

According to the shape of a battery case, the secondary battery is classified into a cylindrical type battery and a rectangular type battery in which an electrode assembly is placed within a cylindrical type or rectangular type metal can, and a pouch type battery in which the electrode assembly is placed within a pouch type case of an aluminum laminate sheet.

The electrode assembly placed within the battery case is an electricity generation device composed of a stack structure of positive electrode/separator/negative electrode capable of charging and discharging, and classified into a jelly roll type formed by winding elongated sheet-type positive electrode and negative electrode coated with active material, along with a separator being interposed therebetween, and a stack type formed by sequentially stacking a plurality of positive and negative electrodes in certain size, along with the separator being interposed therebetween.

As a step-forward structure of the electrode assembly, a combined form of the jelly roll type and the stack type, i.e., a stack/folding type electrode assembly has been developed, in which a full-cell in a certain unit size with a positive electrode/separator/negative electrode structure or a bi-cell with a positive electrode (negative)/separator/negative electrode (positive)/separator/positive electrode (negative) structure, is folded by using a long and continuous separator film.

Further, in order to enhance the process efficiency of a related stack type electrode assembly and to meet the demands for various types of the secondary battery, a lamination/stack type electrode assembly has also been developed, in which unit cells each having the alternately stacked and laminated electrodes and separators are stacked.

Meanwhile, demands for the lithium secondary battery increased, because it is the secondary battery that has a light weight and high energy density. However, compared to the consumer's continuously increasing request for a high energy density battery, energy density of the lithium secondary battery has not sufficiently met the consumer's request.

In order to solve the problem, an effort has been made to increase energy density by using internal space of the secondary battery. However, the effect is less than sufficient, due to structural limitations of the secondary battery.

Specifically, for the battery form in which a plurality of electrode plates and separators are stacked, despite many efforts to reduce a volume occupied by electrode tabs protruded from the electrode plates and a volume occupied by a coupler connecting the electrode tabs and the electrode leads, these efforts failed to bring about satisfactory effects.

Accordingly, for the battery form in which a plurality of the electrode plates and separators are stacked, new technology that can enhance energy density while maintaining overall structure, is highly necessary.

DISCLOSURE

Technical Problem

The present disclosure is designed to solve the problems of the related art, and therefore the present disclosure is directed to providing an electrode assembly with the enhancement of space utilization by connecting an electrode tab including a bending portion with an electrode lead, a battery cell including the same, and a method for manufacturing the same.

Further, the present disclosure is directed to providing a battery cell in which energy density is much enhanced by positioning a tab-lead coupler on an outermost electrode plate or an extension line thereof in a state where the electrode tabs are in a bent state.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an electrode assembly in which at least one electrode plate and separator are alternately stacked, which may include an electrode tab protruded from the electrode plate and an electrode lead electrically connected with the electrode tab by a tab-lead coupler, in which the electrode tab may be in a bent state.

According to an embodiment, when it is stated that the electrode tab is in a 'bent state', it indicates a state in which the electrode tabs protruded from the electrode plate are vertically unsymmetrical based on a center of the electrode assembly.

In a related electrode assembly, since the electrode tabs and tab-lead coupler protrude from one side of an electrode assembly to occupy a certain volume, there is space which cannot contribute to the enhancement of the capacity of a battery cell.

For reference, the battery cell may be a secondary battery which is capable of being repeatedly charged and discharged or a primary battery which is capable of being only discharged irreversibly.

In contrast, the electrode assembly according to an embodiment may significantly enhance energy density of the battery cell by reducing space occupied by the electrode tabs and the tab-lead coupler, the space which could not otherwise contribute to the capacity enhancement of the battery cell.

In one detailed example, the tab-lead coupler may be positioned on an outer surface of the outermost electrode plate, with the electrode tab being in a bent state.

Further, the electrode lead may be structured such that the tab-lead coupler extends in parallel to an outer surface of the outermost electrode plate where the tab-lead coupler is positioned.

In another detailed example, with the electrode tab being in a bent state, the tab-lead coupler may be positioned opposite one side of the electrode assembly on which the electrode tab is protruded.

In this case, the tab-lead coupler may be positioned on an extension line of the outermost electrode plate.

In addition, the tab-lead coupler may be positioned in contact with one side of the electrode assembly or be spaced apart from the electrode assembly by a predetermined distance.

The electrode tabs may be composed of positive electrode tabs and negative electrode tabs, and protruding directions of the positive electrode tabs and the negative electrode tabs may be same as, or different from one other.

The electrode assembly according to an embodiment generally maintains a similar structure to a related electrode assembly. Thus, a battery cell with the enhancement of energy density may be manufactured without significantly modifying the existing manufacturing equipment.

In one detailed example, the separators may have a relatively larger size than the electrode plates, and the electrode tabs may be structured such that it is bent toward the tab-lead coupler, while being kept in non-contact state with ends of the electrode plates by the excess portions of the separators extended longer than the electrode plates.

More specifically, the electrode tabs may be structured in which the excess portions of the separators, as well as the electrode tabs, are bent toward the tab-lead coupler such that the electrode tabs are bent in tight contact with the one side of the electrode assembly.

Even when the electrode tabs are bent toward a specific direction due to the excess portions of the separators, the electrode plates having different polarities as well as the electrode tabs or the tab-lead couplers do not come into contact with each other. Thus, the internal short can be efficiently prevented, and as a result, the stability of the battery cell can be enhanced.

Additionally, since the excess portions of the separators may allow the electrode tabs to be brought into tighter contact with the electrode assembly, the energy density of the battery cell may be further enhanced.

Meanwhile, the outermost electrode plate of the electrode assembly may have different polarity from the tab-lead coupler. Thus, insulation is necessary between the tab-lead coupler and the outermost electrode plate for enhanced stability of the battery cell. In one detailed example, an insulating film may be positioned on the outer surface of the outermost electrode plate, and the tab-lead coupler may be brought into tight contact with the outer surface of the insulating film.

The insulating film may be formed from a material identical to or different from the separator. When the insulating film is formed from the same material as the separator, the separator used in a manufacturing process of the electrode assembly may be used as is. Thus, there is an advantage in view of process efficiency. When the insulating film is formed from a material different from the separator, the stability of the battery cell may be enhanced by adding a mechanical strength to the outermost of the electrode assembly or increasing the insulating property.

In one detailed example, the tab-lead coupler may be fixed at a normal position on the insulating film by a fixing member. Preferably, the fixing member may be an adhesive tape and may cover the tab-lead coupler not to be exposed out.

During a process in which the tab-lead coupler is positioned on the outer surface of the outermost electrode plate of the electrode assembly and the electrode assembly is inserted into the battery case, when the electrode lead is separated out of the normal position, a defect in the appearance of the battery cell may be generated. Therefore, when the tab-lead coupler is fixed with the fixing member, a defect rate of the battery cell may be reduced. In addition, a sharp end of the tab-lead coupler is hidden by the fixing member, which may prevent the pouch case or the insulating film from being damaged.

Further, because the tab-lead coupler is connected with a method such as welding, and so on, the tab-lead coupler may be weaker to an external shock than the other portions. Thus, such coupling structure may be reinforced by surrounding and fixing the outer surface of the tab-lead coupler with the fixing member or the like.

In one detailed example, lengths of the electrode tabs may be same as or different from one another.

Specifically, the electrode tabs may be structured such that the lengths thereof are different from one another, and increase relatively according to increasing distances between the outermost electrode plate and the other electrode plates.

Preferably, the locations of the ends of the electrode tabs may be substantially coincident at the tab-lead coupler even though the electrode tabs are in a bent state.

When the lengths of the electrode tabs are same as one another, the electrode assembly may be manufactured by using a same type of the electrode plates. In this case, high process efficiency can be obtained compared to when using different types of the electrode plates.

However, the electrode tabs having the longer than desired lengths may be included, in which case these electrode tabs may occupy some of the internal space of the battery cell such that it may not be desirable in view of energy density.

On the contrary, when the lengths of the electrode tabs are different from one another, different types of the electrode plates may be used in the manufacturing. In this case, it may be advantageous in view of energy density issue, but the process efficiency may deteriorate because different types of the electrode plate should be used.

Accordingly, during the manufacturing process of the electrode assembly, the electrode plates having the electrode tabs of the same lengths may be used for the sake of process efficiency, and the ends of the electrode tabs may be cut together so that the end points of the electrode tabs are substantially coincident, for the sake of enhanced energy density.

In the present disclosure, the length of the electrode tabs may be from 5 mm to 25 mm, or preferably, from 6 mm to 23 mm. Also, the length of the tab-lead coupler may be from 0.5 mm to 5 mm, or preferably, from 1 mm to 4 mm. However, the above numerical values are just specific examples, and the present disclosure is not limited hereto.

In one detailed example, the electrode assembly may be a stack type electrode assembly, a lamination/stack type electrode assembly, or a stack/folding type electrode assembly.

Further, an embodiment of the present disclosure provides a battery cell in which the electrode assembly as well as electrolyte is sealed in the battery case.

In one detailed example, the battery cell may be structured such that an end of the electrode lead is exposed outside the battery case, and the electrode tabs and the tab-lead coupler are positioned inside the battery case.

In the battery cell according to an embodiment, since the bent electrode tabs and the tab-lead coupler may be positioned inside the battery case, the space occupied by the electrode tabs is reduced, which can enhance the energy density of the battery cell as much.

In one detailed example, the battery case may be a pouch type case made of a laminate sheet, which includes a metal layer and a resin layer.

The laminate sheet may be an aluminum laminate sheet. More specifically, the laminate sheet may be composed of a structure in which a resin outer layer having an excellent durability is added to one surface (external surface) of a metal barrier layer and a resin sealant layer having the hot melt adhesivity is added to the other surface (internal surface).

Because the resin outer layer should have an excellent durability against the external environment, a certain level of the tensile strength and the weatherability is necessary. In this aspect, for a polymer resin of the resin outer layer, polyethylene terephthalate (PET) and a stretched nylon film may be preferably used.

Specifically, the metal barrier layer may be made of aluminum or aluminum alloy in order to provide a function to enhance the strength of the battery case as well as a function to block the introduction or the leakage of external substance such as gas or humidity.

For the polymer resin of the resin sealant layer, polyolefin-based resin, and preferably, casting polypropylene (CPP) may be used, as this has the hot melt adhesivity (thermal adhesivity) and a low hygroscopic property to suppress the penetration of the electrolyte, and is not exploded or eroded by the electrolyte.

Generally, polyolefin-based resin, such as polypropylene, has a low adhesion strength to a metal. Thus, in order to enhance the adhesion strength to the metal barrier layer, the adhesion strength and the blocking property can be enhanced by additionally including an adhesive layer between the metal layer and the resin sealant layer.

For example, for a material of the adhesive layer, urethane-based material, acrylic material and a composition including the thermoplastic elastomer may be used, but not limited hereto.

Meanwhile, the battery cell may be a lithium secondary battery, lithium ion battery, or lithium ion polymer battery.

In one detailed example, the battery case may be structured such that a portion with the tab-lead coupler being positioned thereon may be formed in advance and externally protruded along the shape of the tab-lead coupler.

In another example, the battery case may be structured such that the electrode tab and the tab-lead coupler are positioned in a terrace of the battery case.

As used herein, the 'terrace' of the battery case indicates an internal space of the battery case excluding the electrode assembly having the stack of the electrode plate and the separator. The electrode tabs protruded from the electrode plates of the electrode assembly are coupled with one ends of the electrode leads, and the other ends of the electrode leads are extended externally through a sealing part of the battery case. Thus, the so-called terrace may be defined as the space formed between the electrode assembly and the sealing part opposite to each other in the battery case.

The present disclosure also provides a method for manufacturing a battery cell including an electrode assembly. The method for manufacturing a battery cell includes the processes of: (a) preparing an electrode assembly by alternately stacking electrode plates respectively having a protruded electrode tab and separators; (b) bending the electrode tab protruded from each electrode plate in an upper direction of the electrode assembly; (c) forming a tab-lead coupler by electrically connecting an end of each electrode tab with an electrode lead, respectively, and (d) sealing the electrode assembly having the tab-lead coupler in a battery case together with an electrolyte so that the electrode lead is partially exposed outwards, In an embodiment, in the process (d), the tab-lead coupler may be located on an extension line of an outermost electrode plate of the electrode assembly, which is located at a side where the electrode tab is bent, and the tab-lead coupler may be opposite to one side of the electrode assembly having the protruded electrode tab to come into contact with one side of the electrode assembly or be spaced apart therefrom.

In another embodiment, in the process (d), the tab-lead coupler may be located on an outer surface of the outermost electrode plate of the electrode assembly, which is located at a side where the electrode tab is bent.

Preferably, the method may further include, after the process (b), a process of cutting the electrode tabs so that ends of the electrode tabs are coincident to each other.

Preferably, the method may further include a process of surrounding an end of the tab-lead coupler with an insulating cap.

In the present disclosure, the electrode plate may refer to a positive electrode or a negative electrode.

The positive electrode may be manufactured by applying a positive electrode mixture composed of a positive electrode active material, a conductor and a binder on a positive electrode current collector. If necessary, a filler may be further added to the positive electrode mixture.

The positive electrode current collector may be generally manufactured into a thickness of 3 μm to 300 μm, and not specifically limited to any specific example, as long as it does not cause chemical change on corresponding battery and exhibits high conductivity. The positive electrode current collector may employ any one selected from stainless steel, aluminum, nickel, titanium, and aluminum or stainless steel surface-treated with carbon, nickel, titanium and silver. More specifically, the positive electrode current collector may be made of aluminum. The positive electrode current collector may have micro bumps formed on the surface thereof to enhance the adhesion strength of the positive electrode active material. The positive electrode current collector may have various structures such as film, sheet, foil, net, porous body, foam, nonwoven fabric, and so on.

The positive electrode active material may be, for example, a layer compound such as lithium cobalt oxide ($LiCoO_2$), lithium nickel oxide ($LiNiO_2$), and so on, or a compound substituted with one or more transition metal; lithium manganese oxide of a chemical formula, $Li_{1+x}Mn_{2-x}O_4$ (where, x is 0 to 0.33), $LiMnO_3$, $LiMn_2O_3$, $LiMnO_2$, and so on; lithium copper oxide ($Li_2CuO_2$); vanadium oxide such as $LiV_3O_8$, $LiV_3O_4$, $V_2O_5$, $Cu_2V_2O_7$ and so on; Ni-site type lithium nickel oxide expressed with a chemical formula $LiNi_{1-x}M_xO_2$ (where, M=Co, Mn, Al, Cu, Fe, Mg, B or Ga, x=0.01 to 0.3); lithium manganese complex oxide expressed with a chemical formula $LiMn_{2-x}M_xO_2$ (where, M=Co, Ni, Fe, Cr, Zn or Ta, x=0.01 to 0.1) or $Li_2Mn_3MO_8$ (where, M=Fe, Co, Ni, Cu or Zn); $LiMn_2O_4$, wherein a part of Li of a chemical formula is substituted with alkaline earth metal ion; desulfide compound; and $Fe_2(MoO_4)_3$, and so on, but not limited hereto.

The conductor may be generally added from 1 wt % to 30 wt % based on a total weight of the positive electrode mixture including the positive electrode active material. The conductor may not be specifically limited to any specific example as long as it does not cause chemical change on corresponding battery and exhibits conductivity, and may include a conductive material such as, for example, graphite such as natural graphite or artificial graphite; carbon black such as carbon black, acetylene black, ketjen black, channel black, furnace black, lamp black, or thermal black; conductive fiber such as carbon fiber or metal fiber; metal powder such as fluorocarbon, aluminum, or nickel powder; conductive whisker such as zinc oxide or potassium titanate; conductive metal oxide such as titanium oxide; and polyphenylene derivatives.

The binder is a component to aid binding of the active material and the conductor and the binding of the current collector, and is generally added from 1 wt % to 30 wt % based on a total weight of the mixture containing the positive electrode active material. Examples of the binder may be polyvinylidene fluoride, polyvinyl alcohol, carboxymethyl cellulose (CMC), starch, hydroxypropylcellulose, regenerated cellulose, polyvinylpyrrolidone, tetrafluoroethylene, polyethylene, polypropylene, ethylene-propylene-diene ter polymer (EPDM), sulfonated EPDM, styrene-butadiene rubber, fluorine rubber, and various copolymers.

The filler may be optionally used as a component to restrain the expansion of the positive electrode and is not specially limited as long as it is a fibrous material not causing any chemical change to the corresponding battery. The filler may include, for example, olefin-based polymer such as polyethylene or polypropylene, and fibrous material such as glass fiber or carbon fiber.

The negative electrode may be manufactured by applying a negative electrode mixture including a negative electrode active material, a conductor, and a binder. If necessary, the negative electrode mixture may further include a filler or the like.

The negative electrode current collector may not be limited to any specific material as long as it has conductivity and does not cause a chemical change on corresponding battery. The negative electrode current collector may include, for example, copper, stainless steel, aluminum, nickel, titanium, sintered carbon, copper or stainless steel surface-treated with carbon, nickel, titanium, silver, and so on, aluminum-cadmium alloy, and so on. Further, similar to the positive electrode current collector, the negative electrode active material may have increased binding force by forming micro bumps on the surface thereof. The negative electrode current collector may have various structures such as film, sheet, foil, net, porous body, foam, nonwoven fabric, and so on.

According to an embodiment, a thickness of the negative electrode current collectors may be identical within a range of 3 μm to 300 μm, although each may have different values depending on embodiments.

The negative electrode active material may include, for example, carbon such as hard carbon or graphite carbon; metal complex oxide such as $Li_xFe_2O_3 (0 \leq x \leq 1)$, $Li_xWO_2$ $(0 \leq x \leq 1)$, $Sn_xMe_{1-x}Me'_yO_z$ (Me: Mn, Fe, Pb, Ge; Me': Al, B, P, Si, Group I, II, III elements in periodic table, halogen; $0 < x \leq 1$; $1 \leq y \leq 3$; $1 \leq Z \leq 8$); lithium metal; lithium alloy; silicon alloy; tin alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymer such as polyacethylene; and Li—Co—Ni materials.

The separator may be interposed between the positive electrode and the negative electrode, and a thin insulating film having high ion penetration and mechanical strength may be used. A pore diameter of the separator may be generally from 0.01 μm to 10 μm, and a thickness may be generally from 5 μm to 30 μm. The separator may be, for example, olefin-based polymer such as polypropylene, with the chemical resistance and the hydrophobic property; and a sheet or nonwoven fabric made from glass fiber or polyethylene. When the solid electrolyte such as polymer is used for the electrolyte, the solid electrolyte may act also as the separator.

The electrolyte may be lithium salt nonaqueous electrolyte. The lithium salt nonaqueous electrolyte is composed of nonaqueous electrolyte and lithium salt. The nonaqueous electrolyte may employ nonaqueous organic solvent, organic solid electrolyte, inorganic solid electrolyte and so on, but not limited hereto.

The nonaqueous organic solvent may include, for example, aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxyfuran, 2-methyl tetrahydrofuran, dimethylsulfoxide, 1,3-dioxolane, formamide, dimethylformamide, dioxolane, acetonitrile, nitromethane, form acid methyl, methyl acetate, phosphoric acid triester, trimethoxy methane, dioxolane derivatives, sulforan, methyl sulforan, 1,3-dimethyl-2-imidazolidinone, propylene carbonate derivatives, tetrahydrofuran derivatives, ether, pyropionic methyl, and propionic ethyl.

The organic solid electrolyte may include, for example, polyethylene derivatives, polyethylene oxide derivatives, polypropylene oxide derivatives, phosphoric acid ester polymer, poly agitation lysine, polyester sulfide, polyvinyl alcohol, polyvinylidene fluoride, and a polymer including ionic dissociable group.

The inorganic solid electrolyte may include, for example, nitride, halide, and sulphate of lithium, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the nonaqueous electrolyte described above, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides.

For the enhancement of the charge/discharge characteristics, flame retardancy, and so on, the nonaqueous electrolyte may be added with, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, aluminum trichloride, and so on. According to embodiments, in order to impart incombustibility, the nonaqueous electrolyte may further contain halogen-containing solvents such as carbon tetrachloride and ethylene trifluoride. Further, in order to improve high-temperature storage characteristic, the nonaqueous electrolyte may further contain carbon dioxide gas, and may further include fluoro-ethylene carbonate (FEC), propene sulfone (PRS), and so on.

In one detailed example, a lithium salt-containing non-aqueous electrolyte may be manufactured by adding lithium salt such as $LiPF_6$, $LiClO_4$, $LiBF_4$, $LiN(SO_2CF_3)_2$ and so on to a solvent mixture of a cyclic carbonate of EC or PC which is high dielectric solvent and a linear carbonate of DEC, DMC, or EMC which is low viscosity solvent.

An embodiment of the present disclosure also provides a battery pack including the battery cell described above as a unit battery, and a device including the battery pack as a power supply.

The device may be, for example, a laptop computer, a net book, a tablet PC, a portable phone, an MP3, a wearable electronic device, a power tool, an electric vehicle (EV), a hybrid electric vehicle (HEV), a plug-in hybrid electric vehicle (PHEV), an electric bike (E-bike), an electric scooter (E-scooter), an electric golf cart, or an electric power storing system, but not limited hereto.

Because such device constitution and manufacturing thereof are well known in the art, redundant explanations thereof will not be provided in the present disclosure.

Advantageous Effects

As explained above, the electrode assembly according to an embodiment may reduce space occupied by the electrode tabs and the tab-lead coupler which do not contribute to the capacity enhancement of the battery cell, and thus, greatly enhance energy density and output density of the battery cell.

Further, the secondary battery enhanced with energy density can be manufactured without modifying the existing manufacturing equipment.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure should not be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
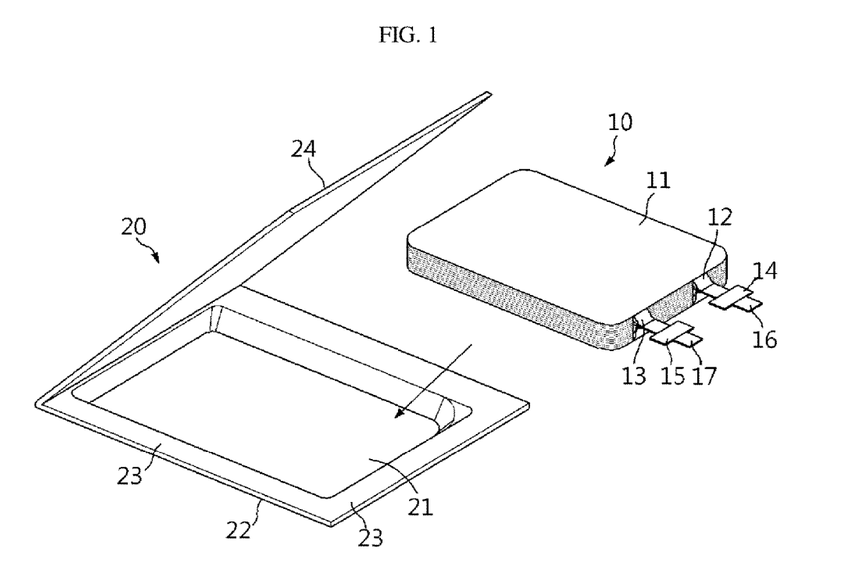
FIG. 1 is a perspective view illustrating an electrode assembly and a battery case of a conventional battery cell.

FIG. 1 illustrates a perspective view of an electrode assembly and a battery case of a conventional battery cell.

Referring to FIG. 1, a general battery cell includes an electrode assembly 10 and a battery case 20. The electrode assembly 10 includes a stacking portion 11, electrode tabs 12, 13, electrode leads 16, 17, and lead tapes 14, 15.

The battery case 20 includes an electrode assembly receiving portion 21 and a cover 24, which are made of a laminate sheet. The laminate sheet includes an outer coating layer 22 and an inner sealant layer 23.

The electrode assembly 10 may include a plate-shaped stacking portion 11 in which two or more unit structures each including a positive electrode and a negative electrode, with a separator being interposed therebetween, are repeatedly stacked. The electrode tabs 12, 13 formed on the positive and negative electrode current collectors are protruded on a relatively narrower surface of the electrode assembly 10. For example, the electrode tabs 12, 13 are extended from an edge of the electrode current collector by a predetermined length.

The electrode tabs 12, 13 having the same polarity may respectively form an assembly, each of the electrode tabs 12, 13 may be electrically connected with the electrode leads 16, 17 having the corresponding polarity. The lead tapes 14, 15 for the enhancement of the sealability with the battery case 20 may be adhered to the electrode leads 16, 17.

The battery case 20 may be a pouch type case composed of the laminate sheet. The coating layer 22 composed of weatherable polymer may be formed outside the laminate sheet, and the sealant layer 23 composed of the hot melt adhesive polymer may be formed inside, and a barrier layer (not shown) including aluminum or aluminum alloy may be formed between the outer coating layer 22 and the inner sealant layer 23.

The electrode assembly receiving portion 21 may be formed in the battery case 20 such that the electrode assembly 10 and electrolyte can be encased together. Accordingly, with the electrode assembly 10 and the electrolyte being placed inside the electrode assembly receiving portion 21, the cover 24 covers the electrode assembly receiving portion 21, and the inner sealant layer 23 is sealed with hot melt adhesion, and as a result, one independent battery cell may be manufactured.

Figure 2:
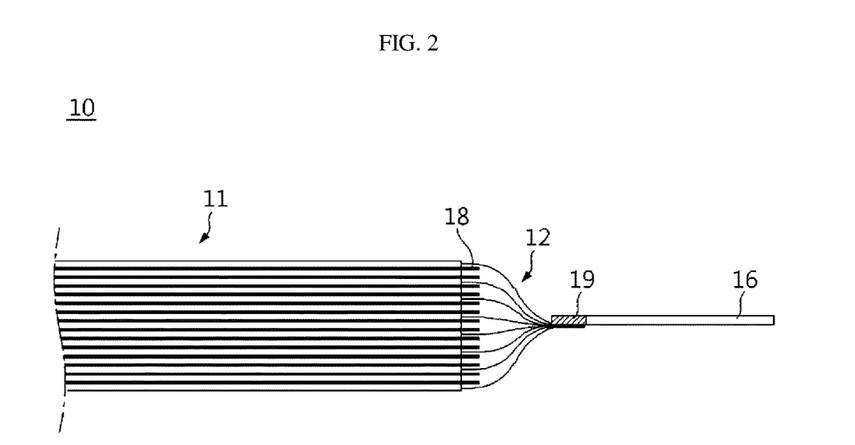
FIG. 2 is vertical cross section view illustrating a portion where electrode tabs and electrode leads of the electrode assembly in FIG. 1 are positioned, according to an embodiment.

FIG. 2 is a vertical cross section view illustrating a portion where the electrode tabs and the electrode leads of the electrode assembly in FIG. 1 are positioned.

Referring to FIG. 2, the electrode assembly 10 includes the stacking portion 11 having the positive electrode and the negative electrode intervened by the separator 18 therebetween, the positive electrode tabs 12, the positive electrode lead 16, and a tab-lead coupler 19.

Specifically, the positive electrode tabs 12 may be each connected to positive electrode plates, and protruded from the positive electrode plates from a right side. The positive electrode tabs 12 may be connected to the positive electrode lead 16 through the tab-lead coupler 19. The connection structure using the tab-lead coupler 19 is substantially identically applied between the negative electrode tabs and the negative electrode lead.

The separator 18 may have a relatively larger size than the positive and negative electrode plates, and be partially protruded from a right side of the stacking portion 11.

Figure 3:
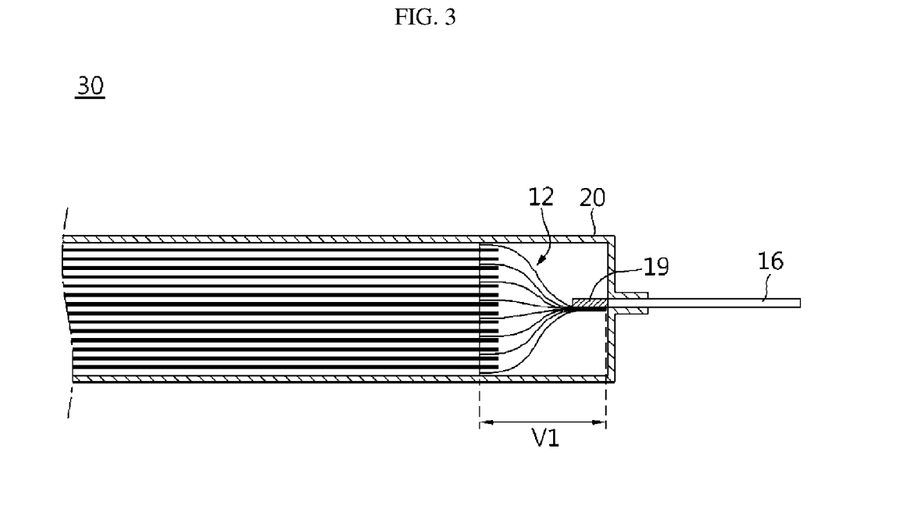
FIG. 3 is a vertical cross section view illustrating a battery cell in which the electrode assembly in FIG. 2 is placed within a battery case according to an embodiment.

FIG. 3 is a vertical cross section view illustrating the battery cell in which the electrode assembly in FIG. 2 is placed within the battery case.

Referring to FIG. 3, in the battery cell 30, the electrode assembly is placed within the battery case 20 in a state where the electrode tabs 12 are connected to the positive electrode lead 16 through the tab-lead coupler 19. Also, a right end of the electrode lead 16 is exposed externally of the battery case 20.

In this case, the electrode tabs 12 and the tab-lead coupler 19 may occupy a volume as much as an area indicated by V1, and the volume corresponding to V1 does not contribute to the battery capacity of the battery cell 30.

Figure 4:
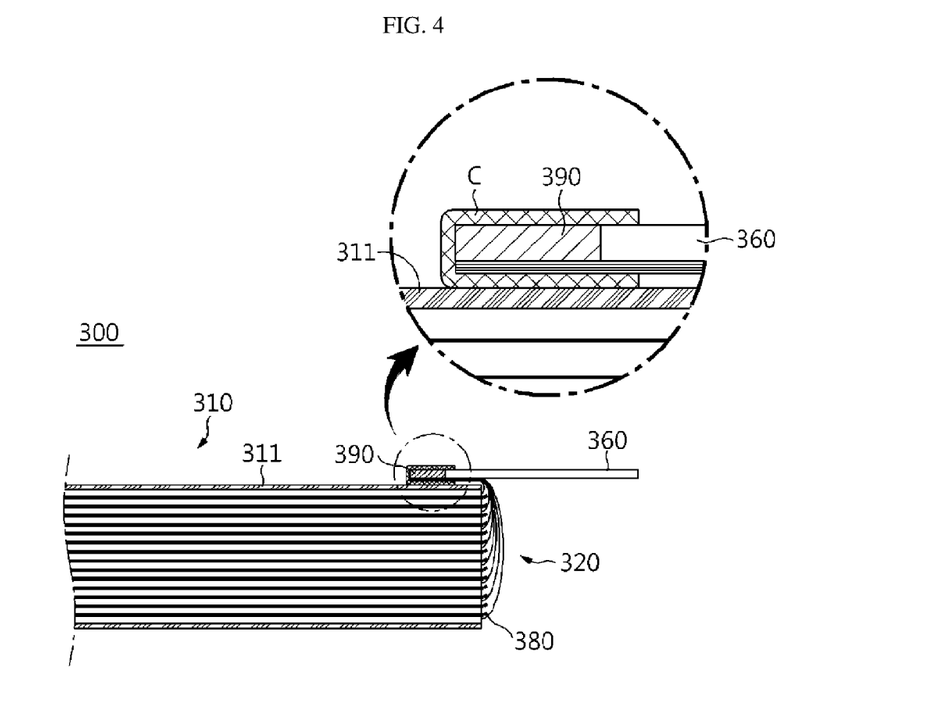
FIG. 4 is a vertical cross section view illustrating a portion where electrode tabs and electrode leads of an electrode assembly are positioned, according to an embodiment.

FIG. 4 is a vertical cross section view illustrating a portion where the electrode tabs and the electrode leads of the electrode assembly are positioned, according to an embodiment.

Referring to FIG. 4 by comparing with FIG. 2, the electrode assembly 300 includes the stacking portion 310 including the positive electrode and the negative electrode intervened by the separator 380 therebetween, an insulating film 311, the electrode tabs 320, the electrode lead 360 and the tab-lead coupler 390.

Specifically, the electrode tabs 320 may be connected to the electrode plates, and extended and protruded from the right side of the electrode plates. The electrode tabs 320 may be connected to the electrode lead 360 by the tab-lead coupler 390.

Preferably, the insulating film 311 may be attached to the outer surface of the outermost electrode plate of the electrode assembly 300. In this case, the tab-lead coupler 390 may be located at and tightly contact with the outer surface of the insulating film 311. Thus, the tab-lead coupler 390 is located over the outermost electrode plate. The insulating film 311 can secure the insulation between the outermost electrode plate and the tab-lead coupler 390 of the electrode assembly 300. In order to firmly secure the location of the tab-lead coupler 390 on the insulating film 311, the upper surface of the tab-lead coupler 390 may be surrounded by a fixing member. Preferably, the fixing member may be an adhesive tape.

The electrode lead 360 is extended in parallel to the outer surface of the outermost electrode plate where the tab-lead coupler 390 is positioned. The electrode assembly 300 has a structure similar to the conventional electrode assembly 10 as a whole. Therefore, in the present disclosure, without considerably modifying the existing manufacturing equipment, the secondary battery enhanced with energy density may be manufactured.

The separators 380 may have a relatively larger size compared to the electrode plates, and may be partially protruded from a right side of the stacking portion 310. The electrode tabs 320 may be bent toward the tab-lead coupler 390, while being kept away from a contact with the ends of the electrode plates due to the excess portions of the separators 380 which extend longer than the electrode plates.

For convenience of explanation, it is illustrated that the electrode tabs 320 are spaced apart from a right end of the electrode assembly 300. However, the electrode tabs 320 may be bent while being maintained in tight contact with the right end of the electrode assembly 300. In this case, the excess portions of the separators 380 may be bent toward the tab-lead coupler 390 together with the electrode tabs 320.

The excess portions of the separators 380 may prevent the electrode tabs 320 from being contacted with the electrode plates having different polarities even when the electrode tabs 320 are bent in a particular direction, thereby efficiently preventing the internal short.

Preferably, the insulating film 311 is a sheet made of a synthetic resin with insulation. For example, the insulating film 311 may be made of a polyethylene resin, a polypropylene resin or a polyethylene terephthalate resin.

Meanwhile, as an optional component, the end of the tab-lead coupler 390 may be surrounded by an insulating cap C. The insulating cap C has a groove corresponding to the shape of the end of the tab-lead coupler 390 and is made of a synthetic resin. For example, the kinds of the synthetic resin are identical to those of the synthetic resin of the insulating film 311. The insulating cap C may be frictionally engaged into the end of the tab-lead coupler 390 or may be inserted into the end of the tab-lead coupler 390 and then adhered thereto by means of an adhesive.

The insulating cap C prevents the battery case or the insulating film 311 from being scratched by the sharp end of the tab-lead coupler 390. In addition, the insulating cap C prevents an electric short circuit from being formed between the tab-lead coupler 390 and the outermost electrode plate.

Figure 5A:
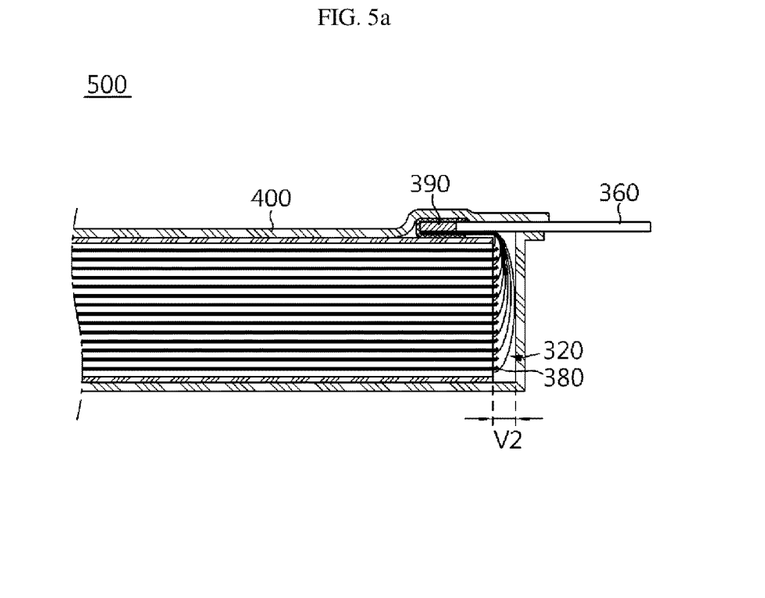
FIGS. 5A and 5B are vertical cross section views illustrating a battery cell in which an electrode assembly is placed within a battery case, according to an embodiment.

FIG. 5A is a vertical cross section view illustrating the battery cell in which the electrode assembly in FIG. 4 is placed within the battery case.

Figure 5B:
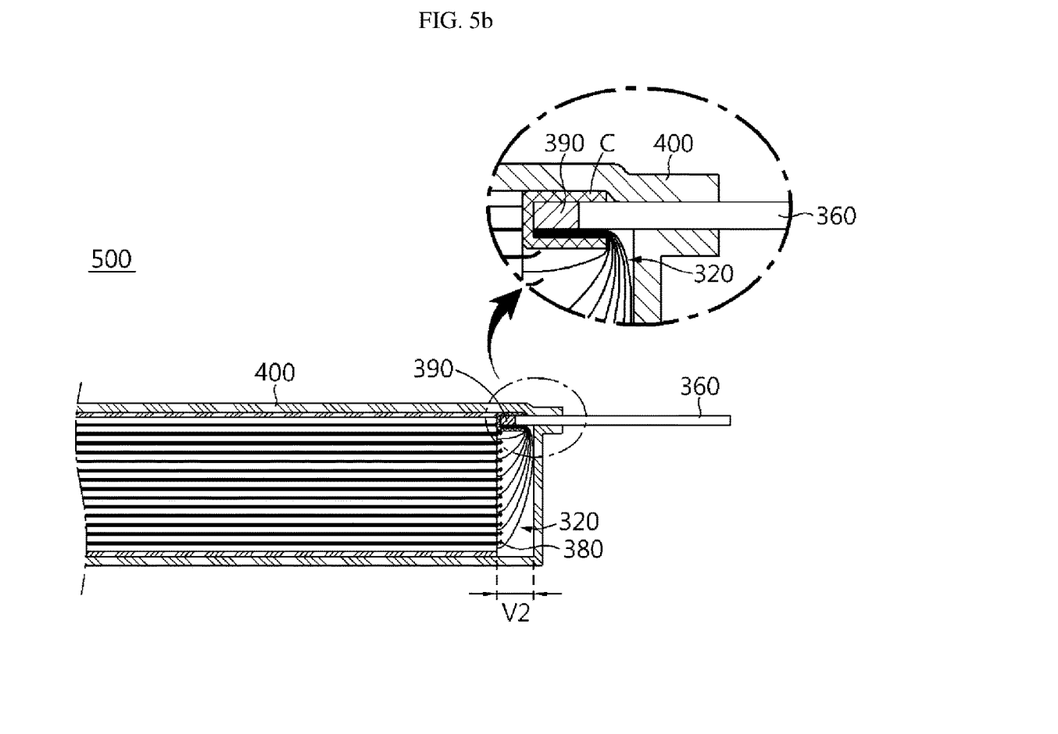

FIG. 5B is a vertical cross section view illustrating the battery cell 500 including the electrode assembly 300 placed within the battery case in which the tab-lead coupler 390 is positioned opposite one side of the electrode assembly 300 where the electrode tab 320 is protruded.

Referring to FIG. 5B, the tab-lead coupler 390 is positioned in contact with the electrode assembly 300. The tab-lead coupler 390 is not disposed directly on the outermost electrode plate but located on an extension line of the outermost electrode plate, different from FIG. 5A.

Although not illustrated, according to an embodiment, the tab-lead coupler 390 may not be contacted with one side of the electrode assembly but be opposite to one side of the electrode assembly in a state of being slightly spaced apart therefrom.

Meanwhile, in another embodiment, the end of the tab-lead coupler 390 may be surrounded by the insulating cap C. In this case, even though the tab-lead coupler 390 is closely adhered to one side of the electrode assembly, it is possible to prevent a short circuit from being formed between the electrode plates having different polarities and the tab-lead coupler 390.

Referring to FIGS. 5A and 5B by comparing with FIG. 3, the battery cell 500 may be configured such that the electrode tabs 320 in a bent state is connected with the electrode lead 360 through the tab-lead coupler 390 and placed within the battery case 400. In addition, a right end of the electrode lead 360 is exposed externally of the battery case 400.

In this battery cell of the present disclosure, a volume of an area occupied by the electrode tabs 320 and the tab-lead coupler 390 is V2. It may be found that the volume V2 is greatly reduced compared to the volume V1 of the area occupied by the positive electrode tabs 12 and the tab-lead coupler 19 in the conventional battery cell 30.

Therefore, the battery cell 500 according to the present disclosure has a reduced volume by about a difference between V1 and V2, and thus energy density may be enhanced as much.

One of battery cells used in the art has a horizontal length of 100.0 mm, a vertical length of 315.0 mm, and a thickness of 10.6 mm. If this battery cell is manufactured by applying the present disclosure, the vertical length decreases by 7.5 mm, and the thickness of a portion where the tab-lead coupler is positioned increases by 0.9 mm. As a result, it is found that the capacity of the battery cell increases by about 5%.

In addition, in the battery cell depicted in FIG. 5B, since the tab-lead coupler 390 is not located on the outermost electrode plate, a step-like protrusion is not formed at all at the upper portion of the battery cell. Thus, when a plurality of battery cells are stacked in a vertical direction, the energy density loss caused by the step-like protrusion may be reduced. In addition, in the embodiment including the insulating cap C, the tab-lead coupler 390 may be adhered to one side of the electrode assembly as close as possible, and thus the energy density of the battery cell may be further enhanced.

Figure 6:
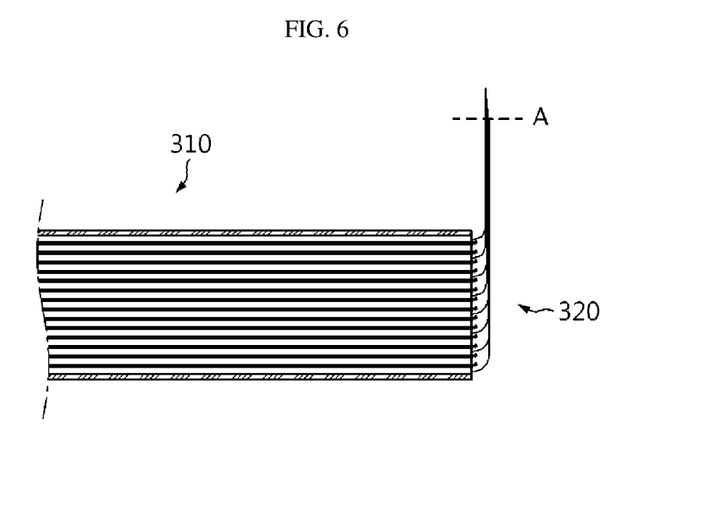
FIGS. 6 to 8 are views illustrating a sequence of manufacturing process of an electrode assembly according to the present disclosure.
Figure 7:
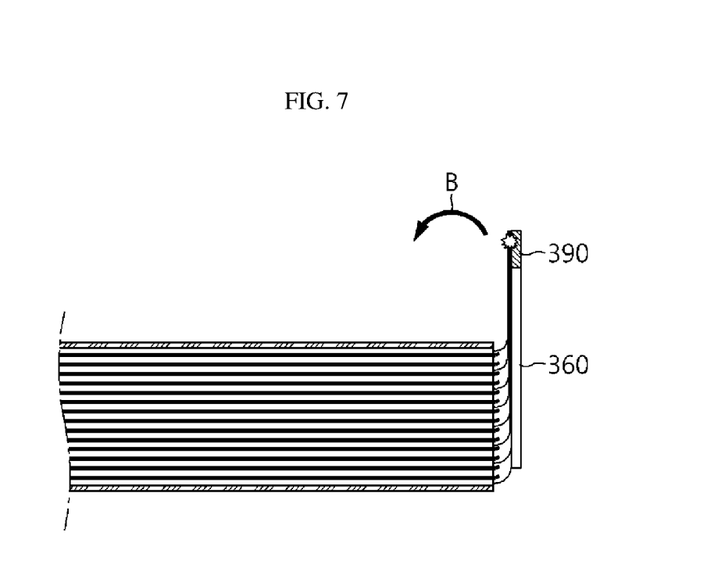
Figure 8:
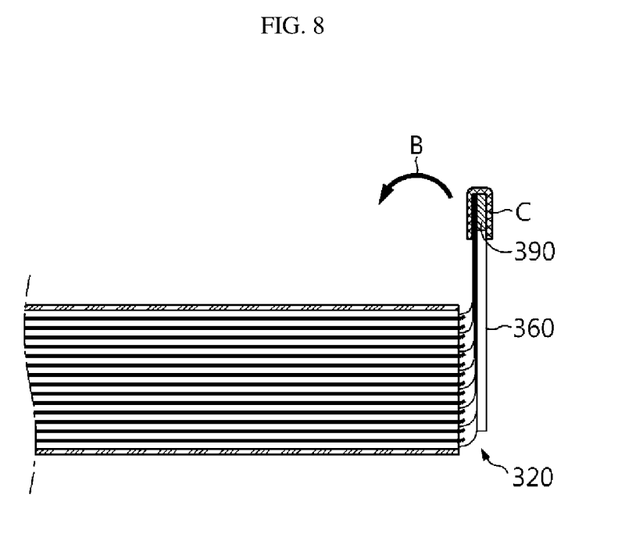

FIGS. 6 to 8 are views illustrating a sequence of processes of manufacturing the electrode assembly in FIG. 4 or 5B.

Referring to FIGS. 6 and 7, the stacking portion 310, in which a plurality of the electrode plates and the separators are alternately stacked, is prepared, and the electrode tabs 320 is bent so as to be directed toward the outer surface of one of the outermost electrode plates in the stacking portion 310.

When electrode plates having the electrode tabs 320 with the same length are used, if the electrode tabs 320 are bent in the same direction, ends of the electrode tabs 320 are not coincided with each other. Therefore, in order to prevent unnecessary space consumption caused by the non-coincidence of the ends of the electrode tabs 320, portions marked by a dotted line A are cut such that the ends of the electrode tabs 320 can become substantially coincident.

Through the above process, the structure may be provided, in which the lengths of the electrode tabs 320 may be different from one another, and increase relatively according to the increase of the distances between the outermost electrode plate and the other electrode plates.

Next, after the ends of the electrode tabs 320 and the electrode leads 360 are overlapped, the tab-lead coupler 390 is formed by means of welding. After that, the electrode tabs 320 are bent in an arrow direction B to prepare the electrode assembly depicted in FIG. 4 or 5B.

In other words, the tab-lead coupler 390 may be located on the outermost electrode plate, or the tab-lead coupler 390 may be located on an extension line of the outermost electrode plate. In the former case, in a state where an insulating film is attached onto the outermost electrode plate, the tab-lead coupler 390 may be disposed on the insulating film. After that, the location of the tab-lead coupler 390 may be secured using a fixing member.

Meanwhile, as an optional process, as shown in FIG. 8, a process of surrounding the end of the tab-lead coupler 390 with the insulating cap C may be further provided, before or after bending the electrode tabs 320.

Finally, the electrode assembly including the tab-lead coupler 390 is sealed in a battery case together with an electrolyte such that the electrode leads are partially exposed outwards, thereby completely manufacturing the battery cell of the present disclosure.

When the battery cell configured as shown in FIG. 5B is manufactured, in the above sealing process, the tab-lead coupler may be closely adhered to one side of the electrode assembly or spaced apart therefrom by a predetermined distance.

The present disclosure has been described in detail. However, it should be understood that the detailed description and specific examples, while indicating preferred embodiments of the disclosure, are given by way of illustration only and various changes and modifications within the scope of the disclosure will become apparent to those skilled in the art from this detailed description.

What is claimed is:

1. A battery cell, comprising:
   an electrode assembly including electrode plates respectively having an electrode tab protruding therefrom and separators, which are alternately stacked on one another in a vertical direction, the electrode tabs being in a bent state and bent relative to the respective electrode plates in the vertical direction of the electrode assembly, the electrode assembly including an electrode lead coupled with an end of the bent electrode tab to form a tab-lead coupler, the tab-lead coupler having an end surrounded by an insulating cap; and
   a battery case configured to accommodate the electrode assembly so that the electrode lead is partially exposed outwards,
   wherein, when the electrode assembly is assembled within the battery case, the tab-lead coupler is located on an extension line of an outermost electrode plate of the electrode assembly and extends in parallel to an outer surface of the outermost electrode plate, which is located at a side where the electrode tabs are bent, and the tab-lead coupler is opposite to one side of the electrode assembly having the protruded electrode tab, the insulating cap surrounding the end of the tab-lead coupler contacting the outermost electrode plate of the electrode assembly,
   wherein the separator is larger than the electrode plate, and the electrode tab is bent toward the tab-lead coupler without coming into contact with an end of the electrode plate by means of an excess portion of the separator elongated farther than the electrode plate, and
   wherein the excess portion of the separator is in a bent state and bent relative to the electrode plates toward the tab-lead coupler together with the electrode tabs such that the electrode tabs are bent while being in tight contact with one side of the electrode assembly.

2. The battery cell of claim 1, wherein the electrode tabs and the tab-lead coupler are positioned in a terrace of the electrode case.

3. A battery pack, comprising the battery cell of claim 1 as a unit cell.

4. A device, comprising the battery pack of claim 3 as a power supply.

5. A method for manufacturing a battery cell, comprising processes of:
   (a) preparing an electrode assembly by alternately stacking electrode plates on one another in a vertical direction of the electrode assembly respectively having a protruded electrode tab and separators;
   (b) bending the electrode tab protruded from each electrode plate in the vertical direction of the electrode assembly, thereby placing the electrode tabs in a bent state and bent relative to the respective electrode plates;
   (c) forming a tab-lead coupler by electrically connecting an end of each electrode tab with an electrode lead, respectively, the tab-lead coupler having an end surrounded by an insulating cap; and (d) sealing the electrode assembly having the tab-lead coupler in a battery case together with an electrolyte so that the electrode lead is partially exposed outwards, wherein in the process (d), when the electrode assembly is sealed in the battery case, the tab-lead coupler is located on an extension line of an outermost electrode plate of the electrode assembly and extends in parallel to an outer surface of the outermost electrode plate, which is located at a side where the electrode tab is bent, and the tab-lead coupler is opposite to one side of the electrode assembly having the protruded electrode tab, the insulating cap surrounding the end of the tab-lead coupler contacting the outermost electrode plate of the electrode assembly, wherein the separator is larger than the electrode plate, and the electrode tab is bent toward the tab-lead coupler without coming into contact with an end of the electrode plate by means of an excess portion of the separator elongated farther than the electrode plate, and wherein the excess portion of the separator is in a bent state and bent relative to the electrode plates toward the tab-lead coupler together with the electrode tabs such that the electrode tabs are bent while being in tight contact with one side of the electrode assembly.

6. The method of claim 5, after the process (b), further comprising a process of:

cutting the electrode tabs so that ends of the electrode tabs are coincident to each other.

* * * * *